(12) United States Patent
Longere

(10) Patent No.: US 6,919,808 B2
(45) Date of Patent: Jul. 19, 2005

(54) DEVICE FOR MONITORING AT LEAST ONE PILOT IN A COCKPIT OF AN AIRCRAFT

(75) Inventor: Jean-Yves Longere, Gardanne (FR)

(73) Assignee: Eurocopter, Marignane Cedex (FR)

( * ) Notice: Subject to any disclaimer, the term of this patent is extended or adjusted under 35 U.S.C. 154(b) by 123 days.

(21) Appl. No.: 10/383,255

(22) Filed: Mar. 7, 2003

(65) Prior Publication Data

US 2003/0169173 A1 Sep. 11, 2003

(30) Foreign Application Priority Data

Mar. 11, 2002 (FR) .......................................... 02 03006

(51) Int. Cl.$^7$ ............................................ G08B 23/00
(52) U.S. Cl. ...................... 340/576; 340/5.81; 340/945; 340/964; 701/3; 244/118.5
(58) Field of Search ............................. 340/576, 573.4, 340/945, 964, 5.8, 574, 573.1, 963, 5.85, 426; 235/384, 375; 701/3–7; 244/118.5

(56) References Cited

U.S. PATENT DOCUMENTS

| | | | | | |
|---|---|---|---|---|---|
| 3,680,499 A | * | 8/1972 | Boudreau | ..................... | 109/32 |
| 3,841,328 A | * | 10/1974 | Jensen | ........................ | 604/135 |
| 4,112,818 A | * | 9/1978 | Garehime, Jr. | ............. | 89/41.05 |
| 5,229,764 A | | 7/1993 | Matchett et al. | ........... | 340/5.52 |
| 5,548,660 A | | 8/1996 | Lemelson | ................... | 382/116 |
| 5,986,543 A | * | 11/1999 | Johnson | ................. | 340/426.19 |
| 6,111,517 A | | 8/2000 | Atick et al. | ................. | 340/5.83 |
| 6,232,874 B1 | | 5/2001 | Murphy | .................... | 340/426.1 |
| 6,641,087 B1 | * | 11/2003 | Nelson | ..................... | 244/118.5 |
| 6,658,572 B1 | * | 12/2003 | Craig | .......................... | 713/200 |
| 6,675,095 B1 | | 1/2004 | Bird et al. | ................... | 701/301 |
| 6,771,186 B1 | * | 8/2004 | Boveja et al. | .............. | 340/945 |
| 2003/0050745 A1 | * | 3/2003 | Orton | ............................ | 701/3 |
| 2003/0068044 A1 | * | 4/2003 | Nikolsky | .................... | 380/258 |
| 2003/0093187 A1 | * | 5/2003 | Walker | .......................... | 701/1 |

FOREIGN PATENT DOCUMENTS

| | | |
|---|---|---|
| DE | 19918490 | 2/2000 |
| FR | 2584842 | 7/1985 |

* cited by examiner

Primary Examiner—Daniel Wu
Assistant Examiner—Son Tang
(74) Attorney, Agent, or Firm—Stevens, Davis, Miller & Mosher, LLP

(57) ABSTRACT

The device (1) comprises a means (2) comprising at least one means of sensory recognition (3, 4), for pre-flight automatic characterization of the pilot who is located at a control station in the cockpit by establishing a reference profile, a means (5) comprising at least one means of sensory recognition (6, 7), for real-time automatic characterization, throughout the flight, of the person located at the control station, by establishing an actual profile, a means (8) for comparing in real time the actual profile with the reference profile, and for transmitting a dissimilarity signal, when they are different, and a means (9) for sending an alert signal to an air traffic control station (10), when a dissimilarity signal is transmitted.

15 Claims, 1 Drawing Sheet

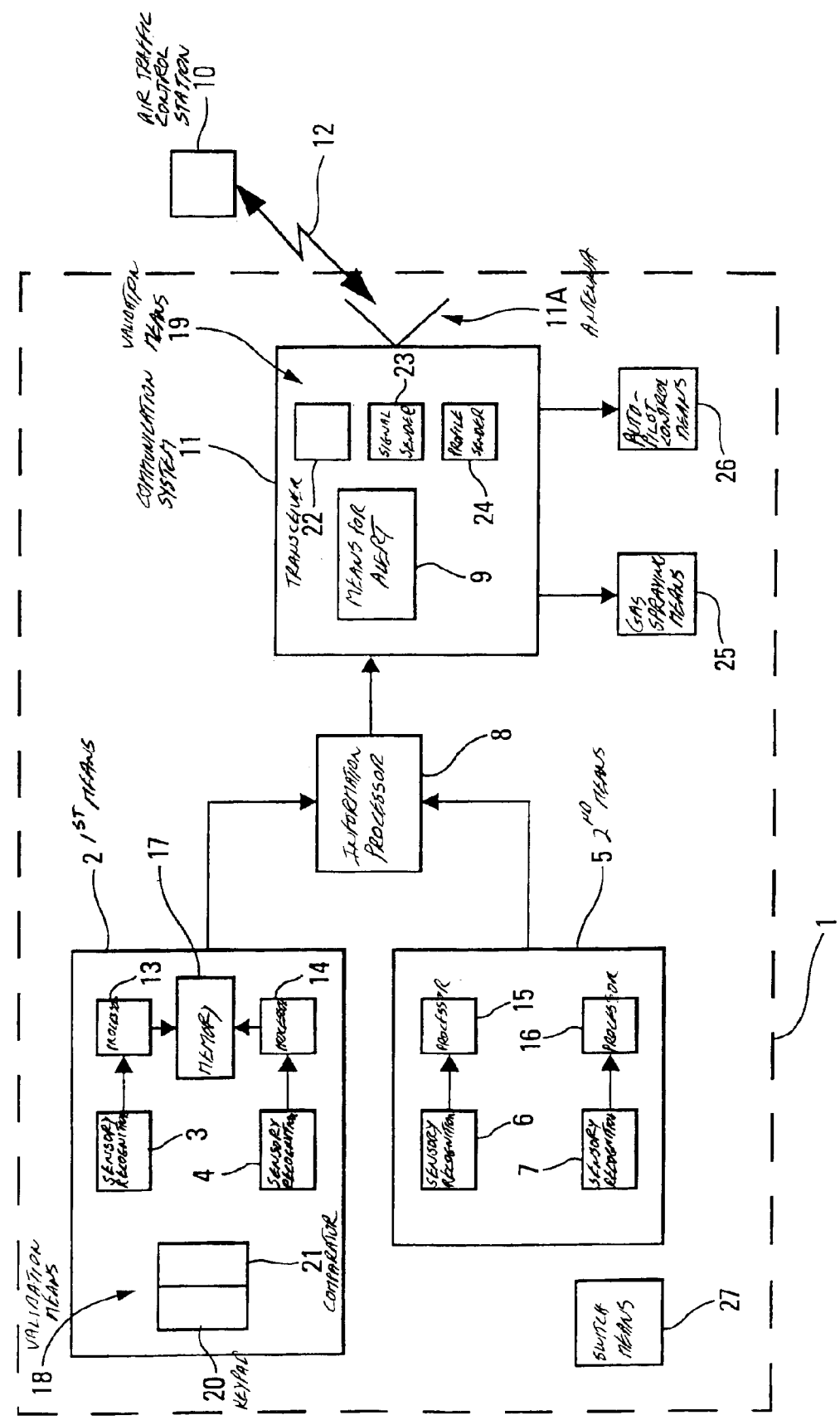

DEVICE FOR MONITORING AT LEAST ONE PILOT IN A COCKPIT OF AN AIRCRAFT

The present invention relates to a device for monitoring at least one pilot in a cockpit of an aircraft.

More particularly, although not exclusively, the objective of the monitoring device of the present invention is to warn the public authorities, through the agency responsible for air traffic control, when unauthorized persons, in particular skyjackers, take possession of the flight controls of an aircraft, in particular of a civil transport airplane.

During the hijacking of an airplane for example, in order to be able to take appropriate measures, it is of course necessary for the public authorities to be warned of the occurrence of this hijacking. Now, skyjackers may wish to conceal the hijacking of an airplane from the various authorities. Furthermore, even if public authorities are warned of the existence of a problem on board an airplane, it is generally very difficult for them, from the ground, to ascertain the real situation on board, and in particular to know who is actually at the controls of the aircraft. Skyjackers can of course benefit from such an absence of information or, at the very least, from a lack of information about the actual situation on board.

The present invention relates to a device for monitoring at least one pilot in a cockpit of an aircraft, the aim of which is to remedy these drawbacks.

Accordingly, said monitoring device is noteworthy, according to the invention, in that it comprises:

- a first means comprising at least one means of sensory recognition, for pre-flight automatic characterization of said pilot who is located at a control station in said cockpit, by establishing a reference profile of said pilot;
- a second means comprising at least one means of sensory recognition, for real-time automatic characterization, throughout the flight, of the person located at said control station, by establishing an actual profile of said person;
- a means of information processing for comparing in real time, throughout the flight, said actual profile with said reference profile, and for transmitting a dissimilarity signal, when said actual profile is different from said reference profile; and
- a means of alert for sending an alert signal to an air traffic control station, when said means of information processing transmits a dissimilarity signal.

Thus, since the (actual) profile of the person (or persons) at the controls of the aircraft is compared, in real time, throughout the flight, with the reference profile of the pilot or pilots, any unauthorized pilot change is detected, and the public authorities responsible for air traffic control are warned thereof, immediately, by way of said alert means.

Within the context of the present invention, the expression "means of sensory recognition" should be understood as any standard means of recognition, such as visual (recognition of the retina or of the shape of the face for example), vocal, tactile (hands of the pilot on the control stick), or even olfactory, which makes it possible to detect a set of particular characteristics (referred to as the profile) which are representative of the person monitored.

Advantageously, each of said first and second means comprises at least two different means of sensory recognition, respectively of a first type and of a second type, establishing a first profile and a second profile respectively. In this case, advantageously:

- in a first variant, said means of information processing transmits a dissimilarity signal, when at least one of said first and second actual profiles is different from the corresponding first or second reference profile; and
- in a second variant, said means of information processing compares in real time, throughout the flight, only said first actual profile with said first reference profile and transmits, when they are different, a dissimilarity signal, and said device furthermore comprises a means of confirmation for comparing said second actual profile with said second reference profile, only when a dissimilarity is assumed, and for transmitting a dissimilarity confirmation signal, when in this case said second actual profile is also different from said second reference profile.

In order to increase the reliability of the monitoring device in accordance with the invention, advantageously, at least said means of sensory recognition of said second means exhibits a coverage of 360° at said control station and/or it comprises a temporal filter.

Additionally, according to the invention, said means of information processing transmits, should there be a difference between the actual profile and the reference profile, a dissimilarity signal, only if said actual profile corresponds to a person, that is to say only if a person is indeed located at the control station, and not during a straightforward absence of the pilot.

Moreover, advantageously, said monitoring device furthermore comprises at least one means of validation of said reference profile.

In a first embodiment, said means of validation comprises:

- an element for inputting a particular code; and
- an element for comparing this particular input code with a prerecorded code and for validating the reference profile should said codes (input and prerecorded) be identical.

In a second embodiment, said means of validation comprises:

- an element for sending a validation request signal to an air traffic control station; and
- an element for receiving a validation signal from an air traffic control station, and for validating said reference profile, should a validation signal be received in response to a sent validation request signal Additionally, for safety reasons stated hereinbelow, the device in accordance with the invention moreover comprises a means for sending a signal of proper operation to an air traffic control station.

Furthermore, said device can also comprise a means for sending said actual profile or profiles to an air traffic control station should a dissimilarity signal be transmitted, thereby making it possible for the authorities on the ground to attempt to identify the corresponding person or persons (possible skyjackers).

Additionally, to prevent air pilots located at the controls of the aircraft from maneuvering it freely, said device moreover comprises:

- a means which is triggerable from an air traffic control station, for acting on persons located in the aircraft, for example by spraying a soporific gas inside said aircraft; and/or
- a means which is also triggerable from an air traffic control station, for acting on a piloting system of the aircraft, in particular the automatic pilot, doing so either in order to limit the effects of the actuation of the flight controls by the air pilots, or in order to automatically prescribe particular maneuvers such as a forced landing for example.

Of course, the device in accordance with the invention is able to monitor two or more pilots simultaneously.

In this case, in a first variant, said means of information processing transmits a dissimilarity signal, as soon as an actual profile is different from the corresponding reference profile of one of said monitored pilots, whereas, in a second variant, said means of information processing transmits a dissimilarity signal, only when all the (at least two) actual profiles are simultaneously different from the (at least two) reference profiles of all said (at least two) pilots.

It is also conceivable for said means of alert to be able to send at least three different alert signals, namely two alert signals associated respectively with said two pilots, as well as a third alert signal should the two pilots be replaced simultaneously.

The device according to the invention is also suitable for monitoring two crews (or more) which have to swap over in the course of a flight.

In this case, advantageously:

said device furthermore comprises a means for rendering said device passive upon a change of crew, a new reference profile being established for the new pilot or pilots after the change of crew; or before the flight said first means establishes a reference profile for all the pilots of said crews.

The single figure of the appended drawing will elucidate the manner in which the invention may be embodied.

It represents the schematic diagram of a monitoring device in accordance with the invention.

The device 1 in accordance with the invention is intended for monitoring a crew of an aircraft (not represented), for example a civil transport airplane, in the course of a flight of the latter.

To do this, said device 1 which is carried on board the aircraft comprises according to the invention:

a first means 2 comprising at least one means of sensory recognition 3, 4, for pre-flight automatic characterization [that is to say for defining via distinct characteristics (profile)] of each pilot of the crew located at the controls of the aircraft, that is to say located at a control station in the cockpit of the aircraft, by establishing a reference profile of each pilot;

a second means 5 comprising at least one means of sensory recognition 6, 7, for real-time automatic characterization, throughout the flight, of the persons located at each control station (that is to say at the controls of the aircraft), by establishing an actual profile of these persons;

a means of information processing 8 for comparing, in real time, throughout the flight, for each pilot, said actual profile (received by said second means 5) with said reference profile (received by said first means 2), and for transmitting a dissimilarity signal, when said actual profile is different from said reference profile, as will be seen in greater detail hereinbelow; and a means of alert 9 for sending an alert signal to an air traffic control station 10, when said means of information processing 8 transmits a dissimilarity signal. Said alert means 9 is incorporated into a standard communication system 11, which is furnished with a transmission and reception antenna 11A and which communicates, by way of a transmission via electromagnetic waves 12, with appropriate means of said air traffic control station 10, which is generally, but not exclusively, situated on the ground.

Thus, throughout the flight, the (actual) profile of the person (or persons) at the controls of the aircraft is compared, in real time, with the (reference) profile of the pilot (or pilots). Any change of pilot, unauthorized, is therefore detected in real time, and the public authorities responsible for air traffic control are warned thereof immediately, by way of said alert means 9. They can therefore take in full knowledge of the facts the necessary measures, for example advise the aircraft boarding and inspection forces.

Said means of sensory recognition 3, 4, 6 and 7 are standard sensors, for measuring characteristic parameters (such as the voice for example) of the persons monitored. These means of sensory recognition 3, 4, 6 and 7 may be for instance: visual (recognition of the retina or of the shape of the face for example), vocal, tactile (hands of the pilot on the control stick), or even olfactory. With each of these means of sensory recognition 3, 4, 6 and 7, is associated a processing element 13, 14, 15 and 16 which extracts, from the measurements made by said means 3, 4, 6 and 7, a set of parameters characteristic of the persons monitored, which form the "profiles" (actual or reference) of these persons.

The reference profiles formed by the processing elements 13 and 14 of said first means 2 are stored in a memory 17.

Of course, in order for the means 8 to be able to carry out a comparison between a reference profile and an actual profile, it is necessary for the means of sensory recognition (for example the means 3 and 6) from which these profiles stem to be of the same type (visual, vocal), etc., although they can be embodied according to different (standard) embodiments.

In a preferred embodiment (not represented), said first means 2 comprises the same means of sensory recognition as said second means 5, thereby making it possible to reduce the cost and the bulkiness of the device 1.

Of course, in order to implement the present invention, it is sufficient for said first means 2 to comprise a single means of sensory recognition 3 or 4 and for said second means 5 to also comprise a single means of sensory recognition 6 or 7. However, in a preferred embodiment, each of said first and second means 2 and 5 comprises at least two different means of sensory recognition 3, 4 and 6, 7, respectively of a first type and of a second type, establishing a first profile (means 3 and 6) and a second profile (means 4 and 7) respectively.

By way of example, such as represented in the figure, the means of sensory recognition 3 and 6 may be of visual type, so as to recognize the shape of the features of the face, and the means of sensory recognition 4 and 7 may be of vocal type, so as to recognize particular characteristics of the voice.

In a first variant, said means of information processing 8 transmits a dissimilarity signal, when at least one of said first and second actual profiles is different from the first or second corresponding reference profile. This first variant strengthens the hijacking detection capability (it prevents for example recourse to a mask, or even the use of a "double" by hijackers), but on the other hand increases the risk of false alerts.

In a second variant, said means of information processing 8 compares throughout the flight, in real time, only said first actual profile (which is of visual origin) with said first corresponding reference profile and transmits, when they are different, a dissimilarity signal, and said device 1 comprises, moreover, a means of confirmation (which is for example integrated into said means 8) for comparing said second actual profile (which is of vocal origin) with said second corresponding reference profile, only when a difference is assumed, and for transmitting a dissimilarity confirmation signal, when in this case said second actual profile is also different from said second reference profile. Thus, in this second variant for example, when the air traffic control receives an alert signal from the device 1, it begins by asking the crew to provide justification for the modification observed. The response is then used by said device 1, and in particular by the means of vocal recognition 7, to strengthen the certainty of a substitution of the crew by a hijacking crew, and to confirm the substitution if appropriate. The aim is to prevent potential false alerts. False alerts may be related, for example, to deficiencies of the shape recognition systems (means 6). They may also arise from operational causes, for example the passing of a hostess or steward through the field of the cameras of the means 6. Once these verification procedures have been performed, the air traffic control takes the appropriate precautionary measures.

Additionally, to avoid an alarm being generated as soon as a pilot returns, at least said means of sensory recognition 6, 7 of said second means 5 exhibits a coverage of 360° at said control station, for example by using several cameras in the case of a means of recognition 6 of visual type.

Furthermore, at least said means of sensory recognition 6, 7 of said second means 5 also comprises a temporal filter, for avoiding an alarm being generated as soon as a pilot intentionally or unintentionally modifies his profile, for example by grimacing in the case of a recognition of the shape of the face.

Additionally, to avoid the triggering of an alarm when a pilot leaves his control station momentarily, said means of information processing 8 transmits, should there be a difference between the actual profile and the reference profile, a dissimilarity signal, only if said actual profile corresponds to a person, that is to say only if a person is actually located at the controls of the aircraft.

Moreover, according to the invention, said device 1 can furthermore comprise at least one means of validation 18, 19 of said reference profile.

In a particular embodiment, said means of validation 18 comprises:
- an element 20, for example an alphanumeric keypad, for inputting a particular code; and
- an element 21 for comparing this particular input code with a prerecorded code and for validating the reference profile should said codes (input and prerecorded) be identical.

Moreover, as a variant or as an adjunct, the device 1 can also comprise a means of validation 19 which comprises:
- an element, in particular a transmit/receive element 22, which is for example integrated into the communication system 11, for sending a validation request signal to the air traffic control station 10; and
- an element 22 for receiving a validation signal from the air traffic control station 10 (which performs the necessary searches), and for validating said reference profile, should such a validation signal be received in response to a validation request signal.

Additionally, said device 1 furthermore comprises a means 23 which is for example integrated into said communication system 11, for sending, repetitively or continuously, to an air traffic control station 10 a signal indicating a proper operation of the device 1. The halting of the transmission of this signal, which is detected by the command station 10, therefore conveys a failure of the device 1, for example by virtue of sabotage. The air traffic control then knows that it can no longer trust said device 1.

The latter can furthermore comprise a means 24 which is for example integrated into the communication system 11, for sending the actual profile to an air traffic control station 10, should a dissimilarity signal be transmitted. This allows the air traffic control to attempt to identify the person, for example a skyjacker, located at the controls of the aircraft, and therefore to be able to plan an appropriate response. The identification can use automatic means, for example the comparison of the actual profile measured in flight, with a database comprising profiles of suspects (terrorists for example).

Although said means 22, 23 and 24 are preferably integrated into the communication system 11 for reasons of simplification of the device 1, at least some of these means 22, 23 and 24 may also correspond to individual systems for transmitting (and possibly for receiving) electromagnetic signals 12.

Additionally, in order to prevent skyjackers who have taken the controls of an aircraft from maneuvering it so as for example to perpetrate an attack, a hijack or an unauthorized landing, said device 1 can furthermore comprise:
- a means 25 which is triggerable from an air traffic control station 10, for example via the communication system 11, for acting on persons located in the aircraft, in particular by spraying a soporific gas inside the aircraft (for example to avoid hostages being blackmailed); and/or
- a means 26 which is triggerable from an air traffic control station 10, for example via the communication system 11, for acting on a piloting system, such as the automatic pilot of the aircraft. Accordingly, several solutions are possible, and in particular:
  measures making it possible to prevent a terrorist action while waiting for the boarding and inspection forces: prevent too large a rate of drop (to avoid the diving of the aircraft), prescribe the holding of a minimum altitude, prescribe a course, or prevent a landing; or more active measures: prescribe a forced landing.

Of course, the device 1 can be used to monitor a single pilot of the aircraft, either because there is only a single pilot on the aircraft, or because a choice was made previously. However, preferably, said device 1 is used to monitor at least two crew members (pilots) simultaneously.

In this case:
- in a first variant, said means of information processing 8 transmits a dissimilarity signal, as soon as an actual profile is different from the corresponding reference profile of one of said pilots, thereby making it possible to detect the case where skyjackers are forcing one of the pilots to remain at his station, even though he no longer has any command over the aircraft. Preferably, in this case, said alert means 9 is capable of sending two different alert signals, associated with said two pilots respectively, as well as a third alert signal should the two pilots be replaced simultaneously; and
- in a second variant, said means of information processing 8 transmits a dissimilarity signal, only when the two actual profiles are simultaneously different from the two reference profiles of said two pilots (complete substitution of the crew by a hijacking crew).

The device 1 in accordance with the invention is also suitable for monitoring two crews (or more) which have to swap over in the course of a flight.

In this case, advantageously:
- in a first variant, said device 1 furthermore comprises a means 27, for example a switch connected to the power supply, for temporarily rendering said device 1 passive during a change of crew, a new reference profile being established for the new pilot or pilots after the change of crew and the activation of the device 1, by way of said first means 2; and in a second variant, said first means 2 establishes right from the outset (pre-flight) a reference profile for all the pilots of said two crews or more.

What is claimed is:

1. A device for monitoring at least one pilot in a cockpit of an aircraft, which device comprises:

a first means comprising at least one means of sensory recognition, for pre-flight automatic characterization of said pilot who is located at a control station in said cockpit, by establishing a reference profile of said pilot;

a second means comprising at least one means of sensory recognition which exhibits a coverage of 360° at said control station and which comprises a temporal filter, for real-time automatic characterization, throughout the flight, of a person located at said control station, by establishing an actual profile of said person;

a means of information processing for comparing in real time, throughout the flight, said actual profile with said reference profile, and for transmitting a dissimilarity signal, when said actual profile is different from said reference profile only if said actual profile corresponds to a person;

a means of alert for sending an alert signal to an air traffic control station, when said means of information processing transmits a dissimilarity signal; and a means for sending a signal of proper operation to said air traffic control station.

2. The device as claimed in claim 1, wherein:

each of maid first and second means comprises at least two different means of sensory recognition, respectively of a first type and of a second type, the first and second types of sensory recognition of the first means establish first and second reference profiles, respectively, and the first and second types of sensory recognition of the second means establish first and second actual profiles, respectively.

3. The device as claimed in claim 2, wherein said means of information processing transmits a dissimilarity signal, when at least one of said first and second actual profiles is different from the corresponding first or second reference profile.

4. The device as claimed in claim 2, wherein:

said means of information processing compares in real time, throughout the flight, said first actual profile with said first reference profile and transmits, when they are different, a dissimilarity signal, and said device comprises a means of confirmation for comparing said second actual profile with said second reference profile, only when the dissimilarity between the first actual profile and the first reference profile is assumed, and for transmitting a dissimilarity confirmation signal, when the comparison establishes that said second actual profile is also different from said second reference profile.

5. The device as claimed in claim 1, which furthermore comprises at least one means of validation of said reference profile.

6. The device am claimed in claim 5, wherein said means of validation comprises:

an element for inputting a particular code; and an element for comparing this particular input code with a prerecorded code and for validating the reference profile should said codes be identical.

7. The device as claimed in claim 5, wherein said means of validation comprises:

an element for sending a validation request signal to an air traffic control station; and an element for receiving a validation signal from an air traffic control station, and for validating said reference profile, should a validation signal be received in response to a sent validation request signal.

8. The device as claimed in claim 1, which furthermore comprises a means for sending said actual profile to an air traffic control station should a dissimilarity signal be transmitted.

9. The device as claimed in claim 1, which furthermore comprises a means which is triggerable from an air traffic control station, for acting on persons located in the aircraft.

10. The device as claimed in claim 1, which furthermore comprises a means which is triggerable from an air traffic control station, for acting on a piloting system of the aircraft.

11. The device as claimed in claim 1, for simultaneously monitoring at least two pilots of the aircraft, wherein:

the first means establishes a reference profile for each of the pilots;

the second means establishes an actual profile for each person located at the control stations;

the means of information processing compares in real time, for each pilot, the corresponding actual and reference profiles and transmits a dissimilarity signal when they differ;

the means for alert sends an alert signal to an air traffic control station when any dissimilarity signal is transmitted.

12. The device as claimed in claim 11, for simultaneously monitoring at least two pilots of the aircraft, wherein:

said means of alert is able to send at least three different alert signals, a first alert signal indicates that the corresponding actual and reference profiles for a first pilot differ, a second alert signal indicate that the corresponding actual and reference profiles for a second pilot differ, and a third alert signal indicates that the corresponding actual and reference profiles for each of the first and second pilots differ.

13. The device as claimed in claim 11, for monitoring at least two crews of at least one pilot each, which have to swap over in the course of the flight, which furthermore comprises a means for rendering said device passive upon a change of crew, a new reference profile being established for the new pilot after the change of crew.

14. The device as claimed in claim 1, for monitoring at least two crews of at least one pilot each, which have to swap over in the course of the flight, wherein before the flight said first means establishes a reference profile for all the pilots of said crews.

15. A device for monitoring at least two pilots in a cockpit of an aircraft, which device comprises:

a first means comprising at least one means of sensory recognition for pre-flight automatic characterization of each of said pilots who are located at a control station in said cockpit by establishing a reference profile of each pilot;

a second means comprising at least one means of sensory recognition, which exhibits a coverage of 360° at said control station and which comprises a temporal filter, for real-time automatic characterization, throughout the flight, of each person located at said control station by establishing an actual profile of each person;

a means of information processing for comparing in real time, throughout the flight, for each pilot said corresponding actual and reference profiles, and for transmitting a dissimilarity signal, only when said reference profile for each pilot is different from said corresponding actual profile and each of said actual profiles corresponds to a person;

a means of alert for sending an alert signal to an air traffic control station, when said means of information processing transmits a dissimilarity signal; and a means for sending a signal of proper operation to said air traffic control station.

* * * * *